United States Patent
Su

(10) Patent No.: US 10,863,464 B2
(45) Date of Patent: Dec. 8, 2020

(54) METHOD OF FRAME EXCHANGE IN MULTI-RADIO SYSTEM

(71) Applicant: MEDIATEK INC., Hsin-Chu (TW)

(72) Inventor: Shih-Chang Su, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/828,345

(22) Filed: Nov. 30, 2017

(65) Prior Publication Data

US 2018/0160384 A1 Jun. 7, 2018

Related U.S. Application Data

(60) Provisional application No. 62/428,558, filed on Dec. 1, 2016.

(51) Int. Cl.
| | | |
|---|---|---|
| H04W 74/08 | (2009.01) | |
| H04W 56/00 | (2009.01) | |
| H04W 16/14 | (2009.01) | |
| H04W 72/12 | (2009.01) | |
| H04B 7/26 | (2006.01) | |

(52) U.S. Cl.
CPC ....... *H04W 56/0015* (2013.01); *H04W 16/14* (2013.01); *H04W 72/1215* (2013.01); *H04W 74/0816* (2013.01); *H04B 7/2687* (2013.01)

(58) Field of Classification Search
CPC .......... H04W 72/082; H04W 72/1215; H04W 76/02; H04W 76/025; H04W 76/04; H04W 88/10; H04W 92/02; H04W 16/14; H04W 28/08; H04W 12/06; H04W 36/0005; H04W 36/0088
See application file for complete search history.

(56) References Cited

U.S. PATENT DOCUMENTS

| | | | | |
|---|---|---|---|---|
| 2005/0059347 A1* | 3/2005 | Haartsen | ........... | H04W 72/1215 455/41.2 |
| 2008/0080685 A1* | 4/2008 | Barnes | ........... | H04M 15/00 379/112.05 |
| 2010/0265856 A1* | 10/2010 | Yang | ........... | H04B 7/2656 370/281 |
| 2011/0261728 A1* | 10/2011 | Ribeiro | ........... | H04W 28/26 370/280 |
| 2012/0147793 A1* | 6/2012 | Chen | ........... | H04W 16/14 370/280 |
| 2015/0195849 A1* | 7/2015 | Bashar | ........... | H04L 5/0092 370/330 |
| 2015/0215811 A1* | 7/2015 | Smadi | ........... | H04W 52/18 370/230 |
| 2016/0095110 A1* | 3/2016 | Li | ........... | H04W 72/1215 370/329 |
| 2016/0192381 A1* | 6/2016 | Gao | ........... | H04W 84/12 370/330 |

* cited by examiner

*Primary Examiner* — Mohamed A Kamara
(74) *Attorney, Agent, or Firm* — Winston Hsu

(57) ABSTRACT

A method of frame exchange for a first communication device in a multi-radio system is disclosed. The method comprises configuring a time division duplex (TDD) operation in a first radio system and a second radio system, receiving a first frame for requesting a frame exchange, from a second communication device of the first radio system, and transmitting a second frame corresponding to the first frame, to the second communication device, wherein the second frame includes a field for indicating a reserve time for the frame exchange, and the reserve time is set to be aligned with a TDD operation time of the first radio system.

9 Claims, 6 Drawing Sheets

METHOD OF FRAME EXCHANGE IN MULTI-RADIO SYSTEM

CROSS REFERENCE TO RELATED APPLICATIONS

This application claims the benefit of U.S. Provisional Application No. 62/428,558, filed on Dec. 1, 2016 and entitled "Apparatus to improve WLAN frame exchange performance among co-located TDD multi-radio system", the contents of which are incorporated herein in their entirety.

BACKGROUND

A wireless communication device may support multiple radio systems (such as Wi-Fi, Bluetooth, ZigBee, LTE, etc.). In addition, multiple radio systems may be co-existence. Thus, radio devices of these co-located radio systems are often coordinated by a time division duplex (TDD) operation to prevent interference to each other.

The applicant notices an interference problem due to co-located radio systems under the TDD operation. Reference is made to FIG. 1. FIG. 1 illustrates a wireless local area network (WLAN) system and a long term evolution (LTE) system co-existence under TDD operation. That is, a timeline is divided into TDD WLAN phases and TDD LTE phases for a WLAN device and a LTE device to perform frame exchange respectively. Ideally, the frame exchange of one radio system phase should not interfere another radio system phase. However, since the WLAN system is operated based on a distributed coordination function (DCF), a contention based mechanism, which may cause channel access delay. Thus, the WLAN device may not be timely coordinated with the LTE device.

In detail, upon the TDD WLAN phase, the WLAN device receives a request to send (RTS) frame from a WLAN AP or the peer WLAN devices, and then transmits a clear to send (CTS) frame to response the WLAN AP or the peer WLAN devices. Note that, the RTS frame may not be align with the start of the TDD WLAN phase due to contentions between the WLAN APs or the other WLAN devices. The WLAN AP or the peer WLAN devices transmits a data frame (i.e. AMPDU or MPDU frame) to the WLAN device after receiving the CTS frame from the WLAN device. In addition, after the WLAN device completely receives the data frame from the WLAN AP or peer WLAN devices, the WLAN device transmits a Block Acknowledgment (BA) or Acknowledgment (ACK) frame to the WLAN AP or the peer WLAN devices. In addition, in the following TDD LTE phase, the LTE device starts to perform frame exchange sequence.

In the conventional IEEE 802.11 protocol specification, the RTS and CTS frames each includes a duration field for protecting frame exchange and channel reservation. Normally, the WLAN device uses the duration field of received RTS frame as reference for deriving and setting responding CTS frame duration field. The WLAN device takes the value of duration field from RTS frame, subtracts short inter-frame space (SIFS) value and time needed for transmitting the responding CTS frame then set this value in the duration field of CTS frame. On the other hand, other WLAN devices check the duration fields of the RTS and CTS frames and set their network allocation vector (NAV) indicators to deter from accessing the channel. Abovementioned specification should be well known in the art. Therefore, in FIG. 1, duration times for frame exchange in the RTS frame and the CTS frame are represented as "NAV by RTS frame" and "NAV by CTS frame" receptively.

With such manner, as shown in FIG. 1, the frame exchange time (i.e. "NAV by RTS frame" and "NAV by CTS frame" of FIG. 1) may be longer than an allowed time of the TDD WLAN phase. In a word, the frame exchange time goes over the TDD WLAN phase and overflow into the TDD LTE phase. In a scenario, the WLAN device may not be able to successfully receiving part of the frame body which is not in WLAN phase and/or may not be able to transmitting the responding BA frame, thus cause a failed frame exchange. Or the WLAN device may, in spite of not in WLAN phase, transmitting the BA frame, and this BA frame transmitting may interfere with the LTE device's frame reception, which may cause data missing. Moreover, current WLAN system tends to aggregate more data in a PPDU (i.e. a big AMPDU specified in IEEE 802.11n and 802.11ac) frame to improve channel utilization rate, which makes the problem worse. Thus, how to effectively operate with other radios devices under the TDD operation is a crucial study.

SUMMARY

It is therefore an objective to provide a method of WLAN frame exchange in multi-radio system in order to solve the abovementioned problems.

The present invention discloses a method of frame exchange for a first communication device in a multi-radio system. The method comprises configuring a time division duplex (TDD) operation in a first radio system and a second radio system, receiving a first frame for requesting a frame exchange, from a second communication device of the first radio system, and transmitting a second frame corresponding to the first frame, to the second communication device, wherein the second frame includes a field for indicating a reserve time for the frame exchange, and the reserve time is set to be aligned with a TDD operation time of the first radio system.

The present invention discloses a method of frame exchange for a first communication device in a multi-radio system. The method comprises transmitting a first frame indicating a required time for a frame exchange, to a second communication device of the multi-radio system, receiving a second frame corresponding to the first frame, from the second communication device, wherein the second frame includes a field for indicating a reserve time for the frame exchange, and the first communication device adjusting the size of following frame of the frame exchange for transmitting to the second communication device according to the reserve time of the response frame.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
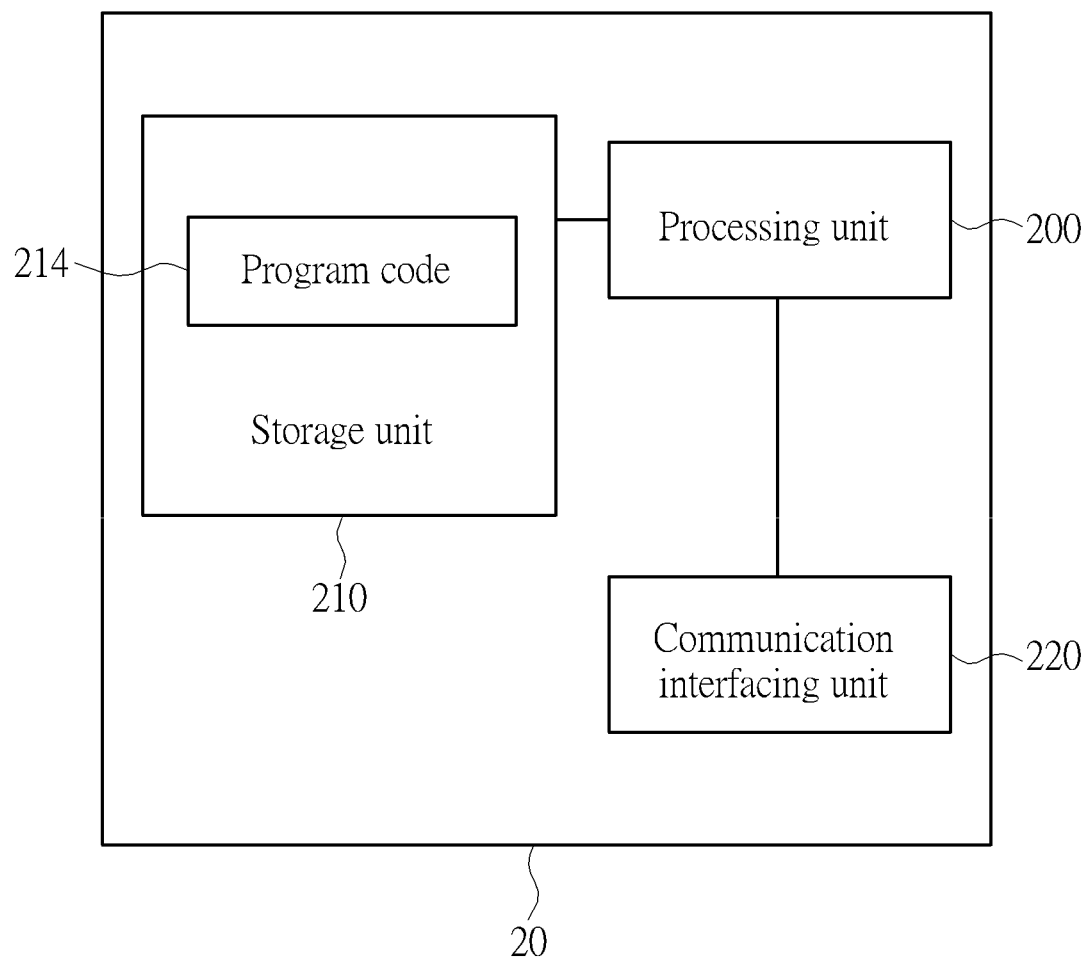
FIGS. 2-2A are schematic diagrams of an exemplary communication device.
Figure 2A:
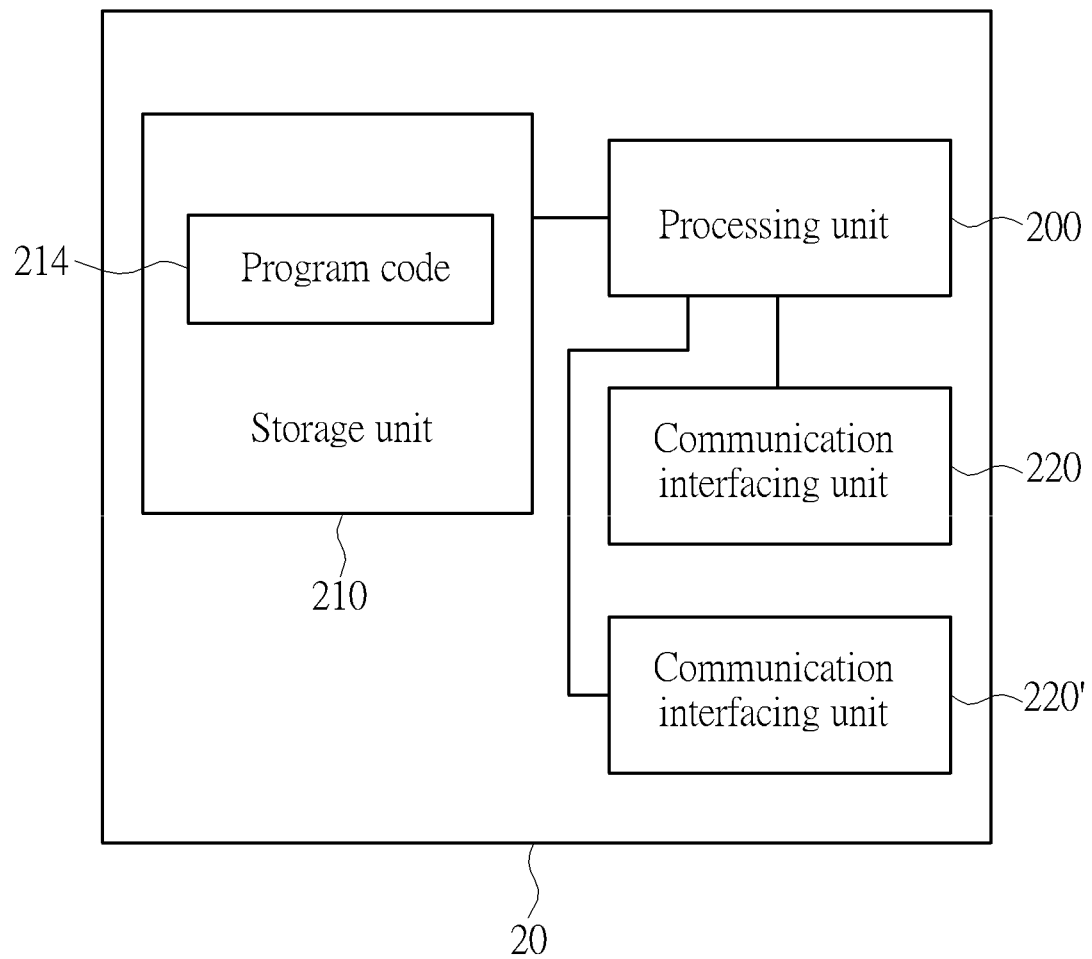

A communication device is operated with TDD operation in a multiple radio system. FIG. 2 illustrates a schematic diagram of an exemplary communication device 20. The communication device 20 can be a WLAN device, a LTE device, a LTE-WLAN aggregation (LWA) device, or any device compatible with wireless specification, such as wearable devices, IoT devices, mobile phones, appliances, machine type devices, etc. The communication device 20 may include a processing unit 200 such as a processor, Application Specific Integrated Circuit (ASIC), etc., a storage unit 210 and a communication interfacing unit 220. The storage unit 210 may be any data storage device that can store program code 214 corresponding to a process, for access by the processing unit 200. The processing unit 200 may be coupled to the storage unit 210, for processing the program code 214 to execute the process. Examples of the storage unit 210 include but are not limited to a read-only memory (ROM), flash memory, random-access memory (RAM), CD-ROMs, magnetic tape, hard disk, and optical data storage device. The communication interfacing unit 220 may be a radio transceiver and can exchange wireless signals according to processing results of the processing unit 200. In addition, as shown in FIG. 2A, the communication device 20 may include two communication interfacing units 220 and 220' for communication in different radio systems, frequencies or channels.

Figure 3:
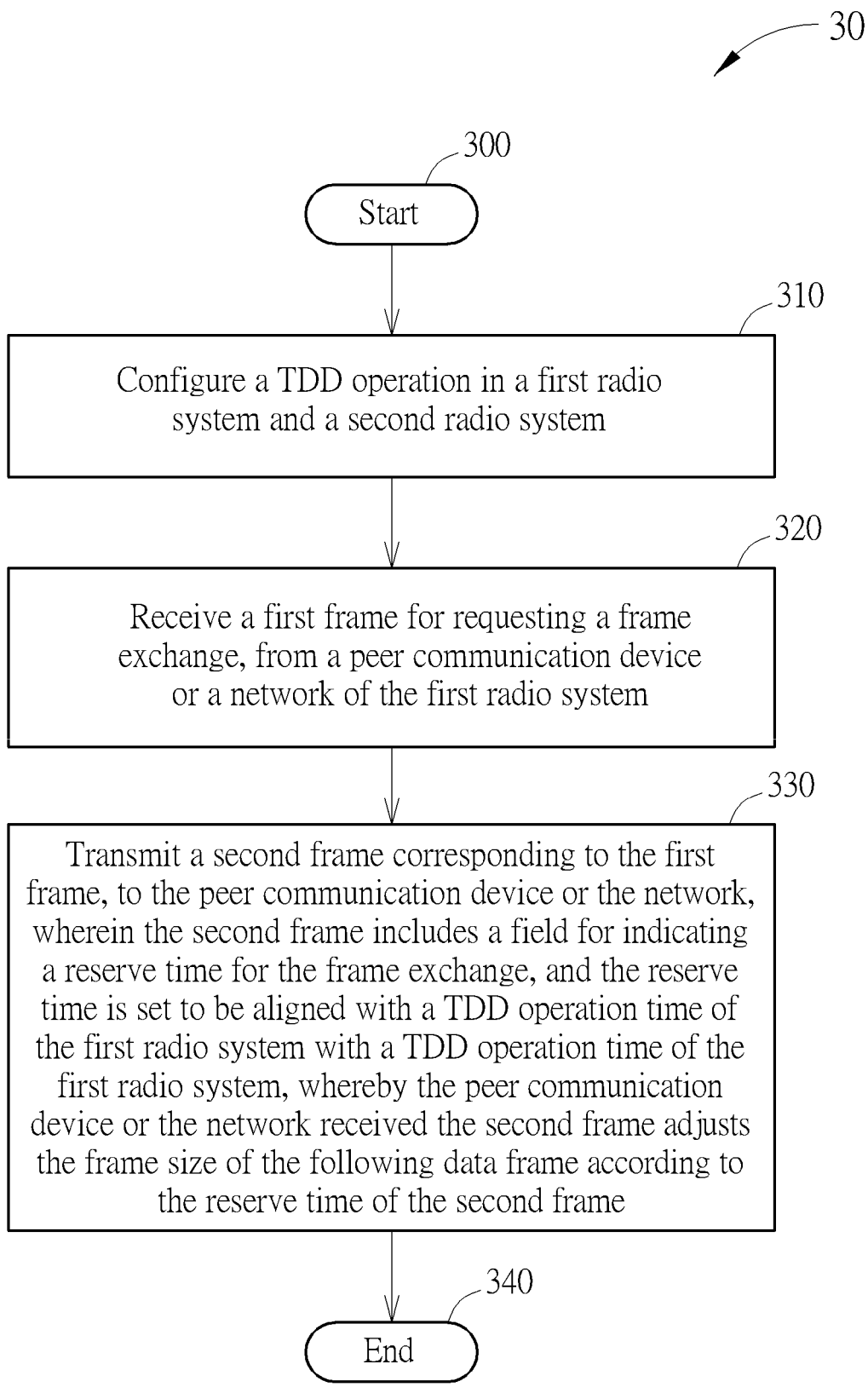
FIG. 3 is a flowchart of an exemplary process according to the present disclosure.

Please refer to FIG. 3, which is a flowchart of a process 30 according to an example of the present disclosure. The process 30 may be utilized in the communication device 20 of FIG. 2 for frame exchange. The process 30 may be compiled into the program code 214 to be stored in the storage unit 310 for being processed by the processing unit 200, and may include the following steps:

Step 300: Start.

Step 310: Configure a TDD operation in a first radio system and a second radio system.

Step 320: Receive a first frame for requesting a frame exchange, from a peer communication device or a network of the first radio system.

Step 330: Transmit a second frame corresponding to the first frame, to the peer communication device or the network, wherein the second frame includes a field for indicating a reserve time for the frame exchange, and the reserve time is set to be aligned with a TDD operation time of the first radio system, whereby the peer communication device or the network received the second frame adjusts the frame size of the following data frame according to the reserve time of the second frame.

Step 340: End.

According to the process 30, the communication device 20 responds to the peer communication device or the network (i.e. an access point (AP)) of a frame exchange period, wherein the frame exchange period is limited to the TDD operation time of the first radio system, to avoid the frame exchange period crossing the next TDD operation time of the second radio system. In a word, with the concept of the process 30, interference between two radio systems or radio channels can be avoided.

Take an example based on the process 30. The communication device 20 is configured with the TDD operation in a WLAN system and a LTE system. With the TDD operation time of the WLAN device, the communication device receives a request frame for requesting the frame exchange from a WLAN AP. The communication device 20 transmits a response frame corresponding to the request frame for accepting the frame exchange, to the WLAN AP, wherein the response frame includes an indication indicating a reserve time for the frame exchange within the TDD operation time of the WLAN system. Note that, the reserve time for the frame exchange shall limited in the TDD operation time of the WLAN system. Thus, frame exchange activity of the WLAN system does not affect frame exchange activity in the TDD operation of the LTE system.

Figure 4:
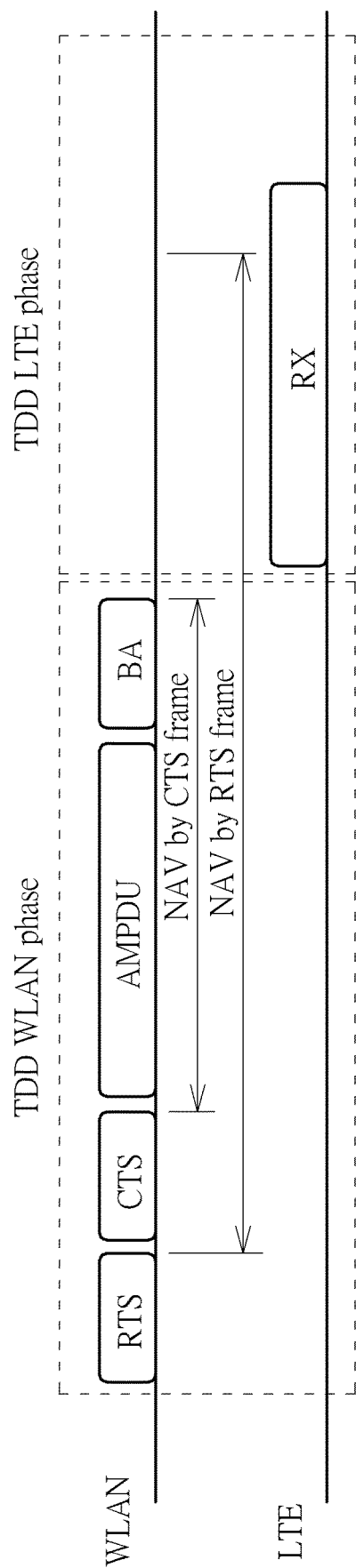
FIGS. 4-5 are schematic diagrams of a frame exchange in a multi-radio system according to the present disclosure.

Please refer to FIG. 4, which is a schematic diagram of a frame exchange in a multi-radio system according to the present disclosure. In FIG. 4, the communication device 20 is operated in the TDD WLAN phase and the TDD LTE phase for frame exchange. In the TDD WLAN phase, the communication device 20 applies the communication interfacing unit 220 for communication on a WLAN frequency/channel. The communication device 20 receives the RTS frame from the WLAN AP, wherein the RTS frame indicating a required time for frame exchange, which is represented by "NAV by RTS frame" in FIG. 4. In addition, the communication device responds with CTS frame to the WLAN AP, wherein the CTS frame indicates a reserve time for frame exchange, which is represented by "NAV by CTS frame" in FIG. 4. The "NAV by CTS frame" should be aligned with the TDD WLAN phase. In such manner, the communication device 20 can fully utilize the TDD WLAN phase for frame exchange.

Figure 1:
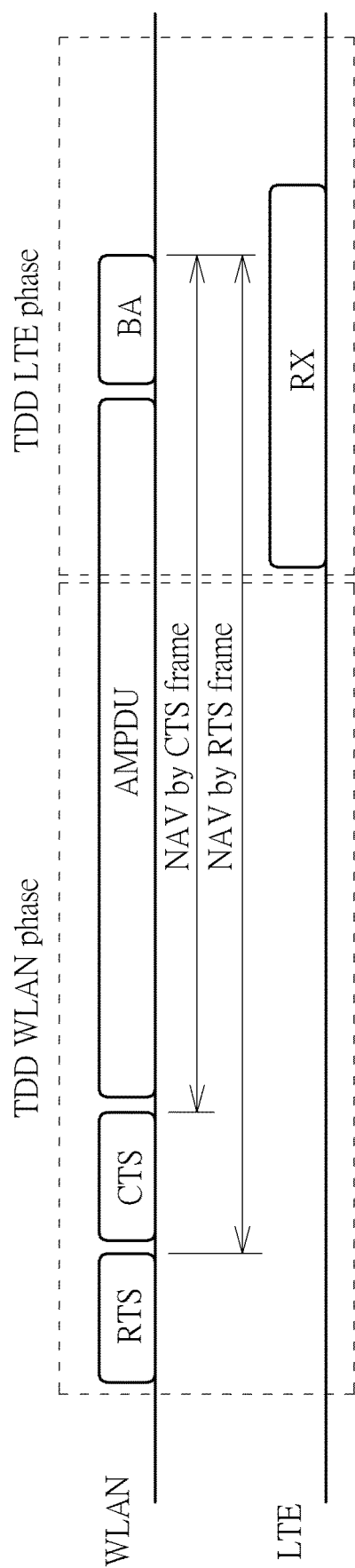
FIG. 1 is schematic diagram of a frame exchange in a multi-radio system according to the prior art.

On the other hand, the WLAN AP adapts the duration indicated by the "NAV by CTS frame" in the CTS frame and adjusts the AMPDU frame size accordingly. Please also referring back to FIG. 1, as shown in FIG. 4, the WLAN AP timely shorts the AMPDU frame size. Thus, the communication device 20 receives the AMPDU frame and responds with BA frame to the WLAN AP within the TDD WLAN phase. In the following TDD LTE phase, the communication device 20 applies the communication interfacing unit 220' of FIG. 2A for frame reception RX on a LTE frequency/channel without interference from the WLAN frame exchange.

As abovementioned, the communication device 20 is capable of determining a proper duration for the frame exchange, to control the frame exchange to be limited in a TDD operation time of a radio system (i.e. TDD WLAN phase). On the other hand, the network or peer communication device determines a suitable data frame size for transmission. Thus, the frame exchange of the radio system can be finished within the TDD operation time of the radio system, to avoid interference on the next TDD operation times of other radio systems (i.e. TDD LTE phase).

Figure 5:
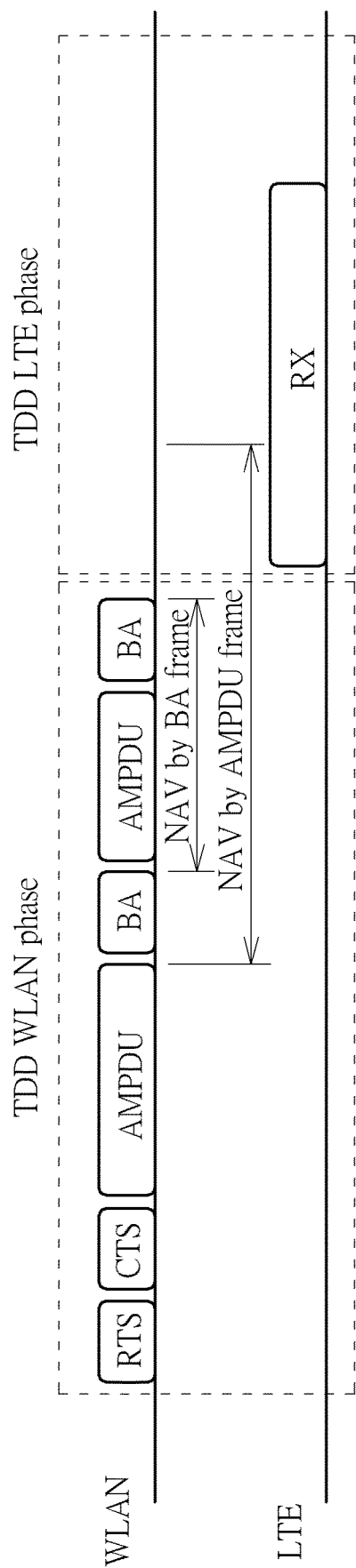

In another embodiment, please refer to FIG. 5. Instead of CTS frame, the communication device 20 may use a BA frame with "NAV by BA frame" to indicate a proper duration for letting the next frame exchange time (i.e. including AMPDU frame and BA frame) aligned with the TDD WLAN phase. Similarly, the WLAN AP receives the "NAV by BA frame" of the BA frame, adopts the duration carried in the BA frame and adjusts the AMPDU frame size accordingly. Thus, the WLAN frame exchange will fit in the TDD WLAN phase without causing interference on the TDD LTE phase.

Note that, the communication device 20 can use any proprietary IE or other applicable parameters to handshake the frame exchange time, and the feature of duration for the time exchange is not limited to be included in the CTS frame or BA frame. Any of response frames to the WLAN AP or peer communication device can be used for handshaking this feature.

The abovementioned steps of the processes/operations including suggested steps can be realized by means that could be a hardware, a software, or a firmware known as a combination of a hardware device and computer instructions and data that reside as read-only software on the hardware device or an electronic system. Examples of hardware can include analog, digital and mixed circuits known as micro-circuit, microchip, or silicon chip. Examples of the electronic system can include a system on chip (SOC), system in package (SiP), a computer on module (COM) and the communication device 20.

In conclusion, the present invention provides a mechanism to timely adjust frame size to avoid frame exchange time exceeding the current radio system phase, so as to reduce interference or data missing on the co-located radio systems. More specific, the communication device calculates a proper duration time for the frame exchange according to the TDD operation time of the currently operated radio system, and therefore includes the duration time in the response frame, to notify the network or peer communication device to adjust the frame size in exchange sequence.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of frame exchange for a first communication device in a multi-radio system comprising a long term evolution, LTE, system and a wireless local area network, WLAN, system, the method comprising:
   configuring a time division duplex (TDD) operation in the LTE system and the WLAN system;
   receiving a first frame for requesting a frame exchange, from a second communication device of the WLAN system; and
   transmitting a second frame corresponding to the first frame, to the second communication device, wherein the second frame includes a field for indicating a reserve time for the frame exchange, and the reserve time is set to be aligned with a TDD operation time of the WLAN system, wherein a required time indicated by the first frame for the frame exchange exceeds the TDD operation time.

2. The method of claim 1, wherein the reserve time is set in a duration field of the second message for notifying other communication devices of the LTE system not to perform frame exchange during the reserve time.

3. The method of claim 1, wherein the first frame includes a request to send (RTS) frame and a data frame, and the second frame includes a clear to send (CTS) frame, an acknowledgment (ACK) frame and a BlockAck (BA) frame.

4. The method of claim 1, further comprising:
   performing the frame exchange with the WLAN system within the reserve time; and
   after the TDD operation time of the WLAN system, performing the frame exchange with the LTE system in the TDD operation time of the LTE system.

5. A method of frame exchange for a first communication device in a multi-radio system comprising a long term evolution, LTE, system and a wireless local area network, WLAN, system, the method comprising:
   transmitting a first frame indicating a required time for a frame exchange, to a second communication device of the multi-radio system, wherein the required time indicated by the first frame for the frame exchange exceeds a TDD operation time;
   receiving a second frame corresponding to the first frame, from the second communication device, wherein the second frame includes a field for indicating a reserve time for the frame exchange; and
   adjusting a size of a data frame of the frame exchange for transmitting to the second communication device according to the reserve time of the response frame.

6. The method of claim 5, wherein the adjusting step comprises:
   shorting the data frame size of the frame exchange according to the reserve time of the response frame.

7. The method of claim 5, wherein the reserve time is set in a duration field of the response message for notifying other communication devices of the first radio system not to perform the frame exchange during the reserve time.

8. The method of claim 5, wherein the first frame includes a request to send (RTS) frame and the data frame, and the second frame includes a clear to send (CTS) frame, an acknowledgment (ACK) frame and a BlockAck (BA) frame.

9. The method of claim 5, further comprising:
   transmitting the adjusted data frame to the second communication device during the reserve time.

* * * * *